Feb. 7, 1956 R. W. WOLFE 2,733,729
PRESSURE-RESPONSIVE, SELF-CLOSING SAFETY VALVE
Filed June 10, 1954
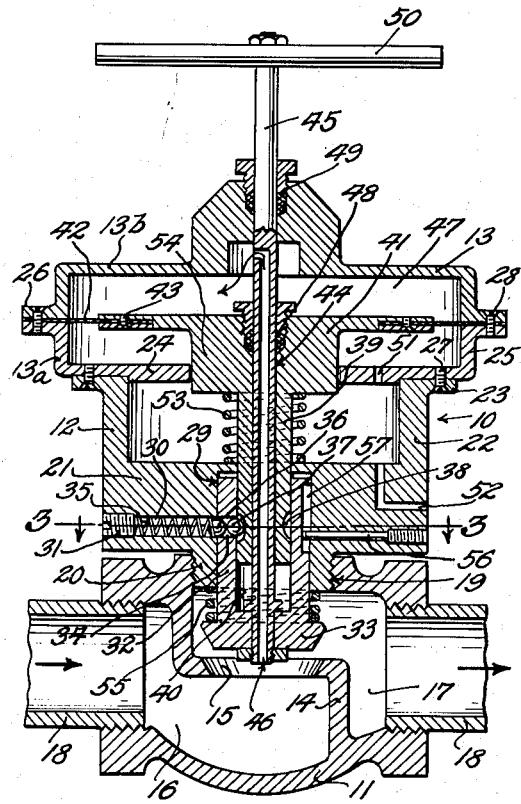
FIG. 1.
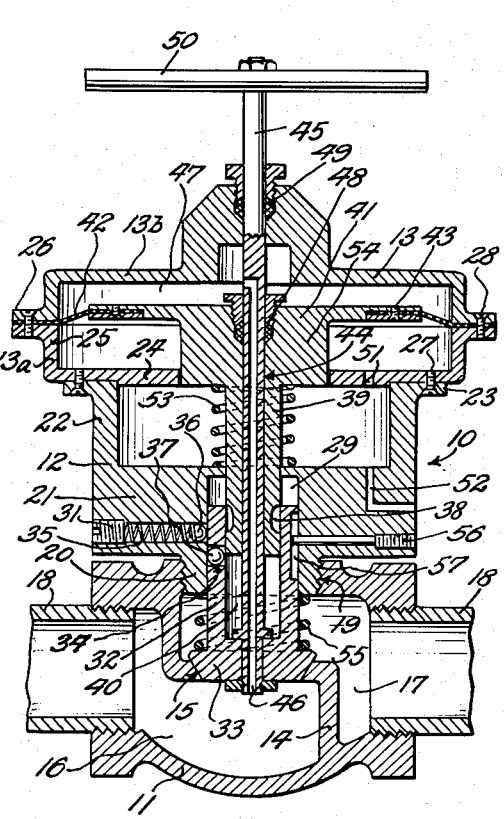
FIG. 2.
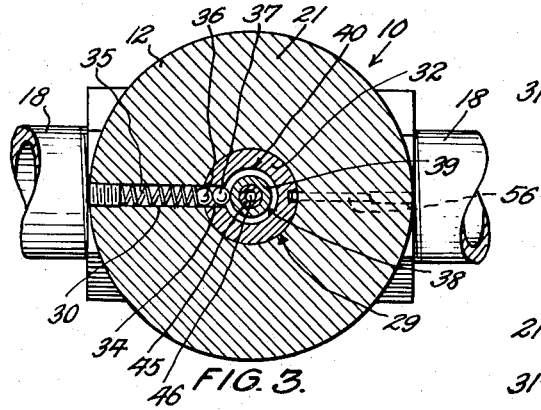
FIG. 3.
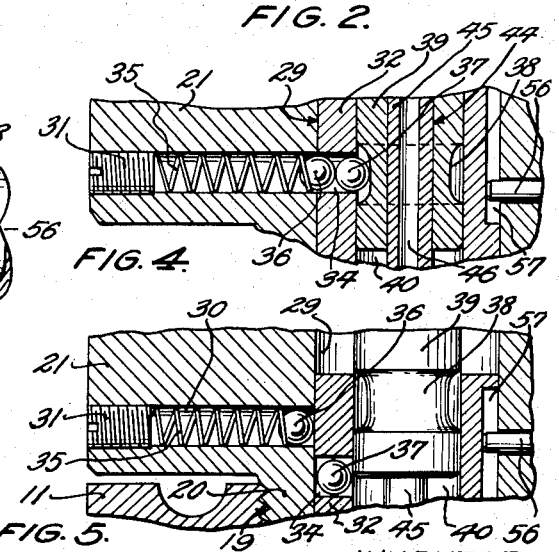
FIG. 4.
FIG. 5.
INVENTOR
Ralph W. Wolfe
BY W. S. Rambo
ATTORNEY

United States Patent Office 2,733,729
Patented Feb. 7, 1956

2,733,729

PRESSURE-RESPONSIVE, SELF-CLOSING SAFETY VALVE

Ralph W. Wolfe, New Lexington, Ohio

Application June 10, 1954, Serial No. 435,819

4 Claims. (Cl. 137—458)

This invention relates to fluid-flow-controlling valves and has particular reference to valves of the pressure-responsive self-closing type, an object of the invention being to provide a valve which will remain open when the pressure of the fluid undergoing flow through the valve is within a normal or predetermined pressure range, but which will automatically arrest such fluid flow when the pressure exceeds said normal range or recedes below the same.

In accordance with the present invention, there is provided an improved pressure-responsive shutoff valve which is adapted to be placed in the main gas supply line or pipe of a home or other building, preferably at a location adjacent the outlet end of the associated gas meter, whereby to automatically shut off the supply of gas to all the various gas appliances contained in the home or building in the event of either an abnormally high or low pressure within the supply line.

It is known that fluctuations in gas pressure beyond certain limits, either high or low, are the cause of considerable trouble and often hazardous conditions. This is due to the fact that, for example, if the pressure falls below a given level, pilot lights may be extinguished, and where a particular appliance is not provided with a special temperature-responsive pilot safety valve, which is not uncommon, there is a definite possibility that raw gas will be introduced to the appliance and will not be ignited when normal gas flow is resumed. Conversely, when the gas pressure exceeds a predetermined high level, pilot flames are ofttimes blown out with the same resultant hazardous conditions.

Therefore, the present invention provides a pressure-responsive safety valve which functions in response to either a predetermined high or low pressure within an associated gas main to cut off the lines leading therefrom to gas-burning appliances. It will be understood that the present safety valve may be used in connection with individual appliances, and as will be further explained, it is not absolutely necessary to place the safety valve in any one particular location relative to the gas supply main or lines associated therewith.

For a further understanding of the invention, reference is to be had to the following description and the accompanying drawing, wherein:

Fig. 1 is a medial vertical sectional view taken through the present safety valve and illustrating the same in its normally open position providing for gas flow therethrough;

Fig. 2 is a similar view showing the valve when closed;

Fig. 3 is a horizontal sectional view taken along the line 3—3 of Fig. 1;

Fig. 4 is an enlarged fragmentary vertical sectional view taken through the spring pressed double ball lock which functions normally to hold the valve in an open position; and Fig. 5 is a similar view of the double ball lock as the same occupies its position when the valve is closed in response to a predetermined low pressure within the line.

Referring more particularly to the drawings, my improved pressure-responsive self-closing valve comprises, in a single satisfactory embodiment, an outer casing 10. While this casing is capable of being formed in various ways, as herein disclosed it comprises a base section 11, an intermediate section 12 and a top or diaphragm section 13. In this instance, the base section is formed internally with a divisional web 14 formed with a seat-forming opening 15 establishing fluid flow communication between an internal fluid inlet chamber 16 on one side of the web and a fluid outlet chamber 17 on the other side of said web. Pipe members 18 for the flow, for example, of fuel gas under appliance-supplying pressures, have their adjacent ends exteriorly threaded for reception in the interiorly threaded ends of said chambers.

Above the web 14 the outlet chamber communicates with a threaded opening 19, the axis of which coincides with the vertical longitudinal axis of the casing 10. Received in the opening 19 is a threaded boss 20 formed on the lower end of the intermediate casing section 12. This section is shown as including a stationary transversely extending wall formation 21 in the lower part thereof and from which the boss 20 integrally depends. The upper part of the intermediate section includes a cylindrical vertically disposed wall formation 22 having an outwardly directed annular flange 23.

Secured to and positioned on the flat circular upper face of the wall formation 22 and flange 23 is the flat circular bottom wall 24 of the lower diaphragm section 13a, the latter including, in the specific form of my invention here illustrated, an upstanding cylindrical side wall 25 having an outturned horizontal flange at its upper circular edge. This flanged edge has separably seated thereon the correspondingly flanged lower edge 26 of the upper section 13b. The diaphragm section 13 is held securely in its operative position on the top of the intermediate section 12 by fastening screws or their equivalents 27, and the upper and lower halves of the diaphragm section are united by fastening screws or the like 28.

The wall formation 21 of the intermediate section includes a vertically and axially disposed socket 29 which intermediately of the height thereof communicates with the inner end of a horizontally and radially extending bore 30, the outer end of said bore being closed by a plug or the like 31.

Positioned for limited longitudinal sliding movement in the socket 29 is the tubular body of a valve member 32. The lower end of this valve member is formed with a head 33 of larger diameter than the tubular body of the valve member, the outer circular wall surfaces of the head being downwardly tapered for seating engagement with the correspondingly tapered wall surfaces of the web opening 15.

Formed in the wall of the tubular body of the valve member is a transverse radial opening 34 which is adapted to be brought into horizontal registry with the inner end of the bore 30 when the valve member is normally positioned, as shown in Fig. 1. Positioned in the bore 30 is a coil spring 35 which is of the expansion type and is confined between the plug 31 and the outer of a pair of adjoining ball devices 36 and 37. The inner ball device 37 normally engages with a concave face formed by an annular groove 38 which is provided in the outer part of a sliding diaphragm stem 39. The latter is received for sliding movement in an internal open-topped socket 40 provided in the valve member 32 above the headed end 33 thereof. The upper end of the stem 39 is integrally joined with and depends from a rigid centrally disposed disk element 41 of a diaphragm structure. Forming a component part of this structure is a flexible diaphragm element 42 of leather or the like, the inner edge of the flexible element being united as at 43 with the associated outer edge of the rigid central element 41. The outer circumferential edge of the flexible element is clamped between the flanged meeting edges of the diaphragm casing sections 13a and 13b and held by the screws 28.

Secured to the headed lower end of the valve member 32 and passing upwardly and axially therethrough and, also, through a vertically aligned bore 44 formed in the stem 39 and disk element 41 of the diaphragm assembly is a valve resetting and manipulating rod 45. This rod includes a longitudinally disposed open-ended passage 46 which, at its lower end is in constant gas flow communication with the inlet chamber 16 and at its upper end with a diaphragm chamber 47 formed in the casing section 13 above the diaphragm elements 41 and 42. In this instance the element 41 is formed axially thereof with a packing gland 48 which surrounds the rod 45. Also, the upper section 13b includes a bonnet having an opening formed therein for the slidable reception of the rod 45, the bonnet being provided axially thereof with a packing gland 49 spaced upwardly from the gland 48. Above the gland 49 the rod includes a handle bar 50 by which it may be conveniently grasped in manipulating the valve member 32.

The lower part of the diaphragm section 13 is provided with a vent 51 and a complemental vent 52 is formed in the intermediate section 12 of the casing and leads to the atmosphere in providing for free flexible movement on the part of the diaphragm in a downward direction. A coiled expansion spring 53 surrounds the stem 39 and is interposed between the hub 54 of the rigid disk element 41 and the upper surface of the wall formation 21 of the intermediate section 12. This spring operates to oppose flexing of the diaphragm in a downward direction and to maintain the latter in a normally elevated position within its chamber. A complemental coil spring 55 of the expansion type surrounds the tubular body of the valve member 32 and is arranged between the upper surface of the head 33 and the under surface of the threaded boss 20, the expansive force of the spring 55 tending to move the valve member 32 in a downward direction for seating engagement with the tapering surfaces of the opening 15. This tendency of the spring 55, however, is curbed normally by the functioning of the ball devices 36 and 37. Axial rotation of the valve member is precluded by a threaded stud 56 carried by the wall formation 21 and having its inner end positioned in a vertical recess 57 formed in the outer cylindrical surface of the valve member.

In view of the foregoing, it will be seen that in the operation of the valve mechanism, when a fluid such as a hydrocarbon fuel gas is flowing under normal or desired pressure through the pipe line represented by the pipe members 18 in which the valve mechanism is interposed, and with the valve member 32 in a raised position, effected by manual operation of the rod 45, and held elevated by the spring-pressed ball devices 36 and 37, gas entering the chamber 16 of the valve will, in part, pass upwardly through the passage 46 of the rod 45 in order to be delivered under a pressure corresponding with that in the supply pipe line into the diaphragm chamber 47. Such a normal fluid pressure in the diaphragm chamber forces downwardly on the diaphragm to maintain the spring 53 under limited compression and bringing the groove 38 in its stem 39 into horizontal registry with the transverse opening 34 in the tubular body of the valve member 32 and the bore 30 of the wall formation of the casing section 12. Such registry enables the spring 35 in said bore to press on the longitudinal aligned spherical locking devices 36 and 37, maintaining the device 37 in the position shown in Figs. 1 and 4, wherein the same is positioned partly in the groove 38 of the diaphragm stem 39 and partly in the transverse opening 34 of the valve member. At the same time the outer ball or locking device 36 is maintained so that half thereof is disposed in the opening 34 and the other half in the bore 30. By these means and under normal fluid pressure in the supply line 18 the valve member is held in its elevated or open position admitting of normal fluid flow through the pipe line.

When abnormal pressures prevail in the pipe line, either above or below a predetermined or so-called "normal" range, such abnormal pressure are transmitted to the diaphragm chamber 47. This condition causes the diaphragm assembly to either lift or drop in operating position with respect to that which it occupies under normal fluid pressures. Upward movement of the diaphragm assembly, such as results from a substantial decrease of pressure within the inlet chamber 16 and diaphragm chamber 47, causes the groove 38 in the stem 39 to move upward and assume a position, such as that shown in Figs. 2 and 5, wherein, it will be noted, the groove is out of its normal position of horizonal registry with the opening 34 and bore 30. As a result of the full diameter of the stem being brought to bear on the ball devices 36 and 37, the latter are shifted longitudinally against the force of the spring 35, thereby moving the ball devices so that the device 36 will be disposed wholly within the confines of the bore 30 and the device 37 wholly within the confines of the opening 34. This positioning of the ball devices frees the valve member from their locking or restraining influence and, through the operation of the spring 55, causes the head of the valve member 32 to be seated in a position of valve closure in the opening 15, thereby arresting automatically fluid flow through the valve. The valve remains closed until the rod 45 is again manually elevated to restore the locking order of the ball devices 36 and 37 in holding the valve member in its elevated valve-opening position. The valve thus provides a safety device for fuel gas systems characterized by its structural simplicity, positive and reliable operation and relatively low cost of manufacture. Due to the use of the low-friction ball-type locking devices the operation of the valve is assured even though the valve should remain for prolonged periods of time in an open position.

While I have set forth in detail a single practical embodiment of my improved pressure responsive self-closing valve, nevertheless it will be understood by those skilled in the art that the essential operating features thereof are capable of being employed in whole or in sub-combination in other structural adaptations, and I, therefore, reserve the right to employ all such variations or modifications of my invention that may be said to fall fairly within the scope of the following claims.

I claim:

1. A pressure-responsive self-closing valve comprising: a casing formed to provide internally disposed relatively spaced fluid inlet and outlet chambers arranged at one end of the casing and a diaphragm chamber at its opposite end; a diaphragm assembly in said casing including a rigid tubular stem movable in the longitudinal axis of said casing; a flexible element secured circumferentially to the walls of said diaphragm chamber and with which said stem is unitarily joined; a first spring means coacting with said stem to oppose movement thereof in its response to fluid pressures developed in said diaphragm chamber on one side of said assembly; a valve member formed with a tubular body and supported for movement longitudinally and axially of said casing, said member at one end thereof including a head movable toward and away from seating engagement with an opening formed in an internal wall of said casing and used in separating said fluid inlet and outlet chambers, the tubular body of said valve member telescopingly receiving therein the movable stem of said diaphragm assembly, said valve member body being formed with a transverse opening adapted for registry on its outer side with a spring-containing bore formed in an intermediately disposed internal wall formation of said casing, and on its inner side with an annular concave groove formed externally on said stem; inner and outer longitudinally aligned ball devices occupying the transverse opening in said valve member body, one of said devices projecting in part beyond said device opening into the bore of the intermediate wall of said casing and the other of said ball devices projecting in part from said device opening into the annular groove of said stem when said valve member occupies a normal position of operation; a second spring means cooperative with said valve member and operative to apply forces thereto tending to move the head thereof into seating engagement with the valve opening providing fluid flow communication between said inlet and outlet chambers; and an exteriorly projecting manipulating rod mounted for sliding movement axially of said casing, said rod having its inner end rigidly joined with and projecting through said valve member and the opposite end thereof extended beyond said casing to provide a hand-grasping region thereon, said rod including an elongated longitudinally extending passage open at one end thereof to the fluid inlet chamber and open at the opposite end thereof for communication with said diaphragm chamber on said one side of the diaphragm assembly therein.

2. A pressure-responsive self-closing valve comprising: a casing formed to provide internally disposed relatively spaced fluid inlet and outlet chambers arranged at one end of the casing and a diaphragm chamber at its opposite end; a diaphragm assembly in said casing including a rigid tubular stem movable in the longitudinal axis of said casing; a flexible element secured circumferentially to the walls of said diaphragm chamber and with which said stem is unitarily joined; a first spring means coacting with said stem to oppose movement thereof in its response to fluid pressures developed in said diaphragm chamber on one side of said assembly; a valve member formed with a tubular body and supported for movement longitudinally and axially of said casing, said member at one end thereof including a head movable toward and away from seating engagement with an opening formed in an internal wall of said casing and used in separating said fluid inlet and outlet chambers, the tubular body of said valve member telescopingly receiving therein the movable stem of said diaphragm assembly, said valve member body being formed with a transverse opening adapted for registry on its outer side with a spring-containing bore formed in an intermediately disposed internal wall formation of said casing, and on its inner side with an annular concave groove formed externally on said stem, inner and outer longitudinally aligned ball devices occupying the transverse opening in said valve member body, one of said devices projecting in part beyond said device opening into the bore of the intermediate wall of said casing and the other of said ball devices projecting in part from said device opening into the annular groove of said stem when said valve member occupies a normal position of operation; a second spring means cooperative with said valve member and operative to apply forces thereto tending to move the head thereof into seating engagement with the valve opening providing fluid flow communication between said inlet and outlet chambers; an exteriorly projecting manipulating rod mounted for sliding movement axially of said casing, said rod having its inner end rigidly joined with and projecting through said valve member and the opposite end thereof extended beyond said casing to provide a hand-grasping region thereon, said rod including an elongated longitudinally extending passage open at one end thereof to the fluid inlet chamber and open at the opposite end thereof for communication with said diaphragm chamber on said one side of the diaphragm assembly therein, normal fluid pressures in said diaphragm chamber, developed by the transmission of fluid handled by the valve and traveling from said inlet to said diaphragm chamber, serving to maintain the stem of the diaphragm assembly, in opposition to forces of said first spring means, in a position of relative balance, so that the annular groove thereof is in registry with and receives in part the inner of the longitudinally aligned ball devices when the valve member has been moved by the manipulation of said rod to a position in which the transverse opening of the body of the valve member is in radial registry with said internal casing bore to cause the outer of said ball devices to enter in part said transverse opening to retain the head of said valve member spaced from said seating opening, pulsatory movement of said stem in response to abnormal fluid pressures in the diaphragm chamber serving to displace said ball devices longitudinally, so that the outer of said ball devices will be disposed wholly in said bore and the inner ball device wholly within the transverse opening of the body of said valve member, whereby to release said valve member from its coupling association with said ball devices and to enable the same to respond to the action of said second spring means in assuming a seated position arresting fluid flow between said inlet and outlet chambers.

3. An automatic, safety, shut-off valve for fuel gas lines comprising casing means provided with a fluid-receiving inlet, a fluid-discharging outlet, a valve seat between said inlet and outlet, and a diaphragm chamber remote from said inlet and outlet; a valve member movable in said casing means into and out of engagement with said valve seat to control the flow of fluid between said inlet and outlet; spring means engaging said valve member and urging the same toward engagement with said valve seat; a manually operable rod extending through said casing means and engaged at one end with said valve member for moving the latter out of engagement with said valve seat and in opposition to said spring means, said rod being formed with a passage communicating at one end thereof with said inlet and at its opposite end with said diaphragm chamber; movable diaphragm means positioned in the diaphragm chamber of said casing means and having one side thereof in fluid communication with said opposite end of the passage of said rod; second spring means engaging said diaphragm means on the side thereof opposite the side in communication with said opposite end of the passage of said rod and urging said diaphragm means to move in one direction within said diaphragm chamber, said diaphragm means being arranged to move in said one direction in response to an abnormal decrease of fluid pressure at said inlet and to move in the opposite direction in opposition to said second spring means in response to an abnormal increase of fluid pressure at said inlet; and means engaged with said diaphragm means and with said valve member for normally holding the latter out of engagement with said valve seat, but operable in response to movement of said diaphragm means in either of said directions for releasing said valve member for seating engagement with said valve seat.

4. An automatic, safety, shut-off valve for fuel gas lines as defined by claim 3 wherein said last-named means comprises a pair of separate abutting members, one of which is arranged to extend partially between said casing means and said valve member, and the other of which extends partially between said valve member and said diaphragm means, and a spring arranged in said casing means and engageable with said one of said abutting members and compressible to permit said abutting members to move from said last-named positions in releasing said valve member.

References Cited in the file of this patent

UNITED STATES PATENTS

| | | |
|---|---|---|
| 1,032,052 | Evans | July 9, 1912 |
| 2,229,543 | Bailey | Jan. 21, 1941 |
| 2,581,071 | Born | Jan. 1, 1952 |